United States Patent [19]

Ejiri

[11] Patent Number: 4,677,607
[45] Date of Patent: Jun. 30, 1987

[54] DISC LOADING MECHANISM FOR DISC PLAYER

[75] Inventor: Kazushige Ejiri, Iwaki, Japan

[73] Assignee: Alpine Electronics Inc., Japan

[21] Appl. No.: 736,217

[22] Filed: May 20, 1985

[30] Foreign Application Priority Data

May 19, 1984 [JP] Japan .............................. 59-72610[U]

[51] Int. Cl.<sup>4</sup> ............................................. G11B 25/04
[52] U.S. Cl. .................................................. 369/77.1
[58] Field of Search ....................................... 369/77.1

[56] References Cited

U.S. PATENT DOCUMENTS

| 3,891,796 | 6/1975 | Takahara et al. | 360/133 |
| 4,470,136 | 9/1984 | Takahashi et al. | 369/77.1 |
| 4,498,162 | 2/1985 | Schatteman | 369/77.1 |

*Primary Examiner*—Steven L. Stephan
*Attorney, Agent, or Firm*—Guy W. Shoup

[57] ABSTRACT

Herein disclosed is a disc loading mechanism for use with a disc player such as a video or compact disc player of slot-in type including: disc playing means for playing a disc recorded with data when the disc is brought to a play position; and a casing accommodating the disc playing means therein and formed in its front side with a disc slot through which the disc is inserted directly into the casing. The disc loading mechanism comprises: a pair of guide rails extending in the casing of the disc player from near the two ends of the disc slot of the casing and juxtaposed to each other at a spacing slightly larger than the diameter of the disc for guiding the disc inbetween; a loading roller interposed between the disc slot of the casing and the guide rails and made rotatable and reciprocally movable in parallel with the front side of the casing for engaging with the circumferential edge of the disc to drive the disc inwardly of the casing until the disc arrives at the play position; and drive means for driving the loading roller back and forth.

3 Claims, 4 Drawing Figures

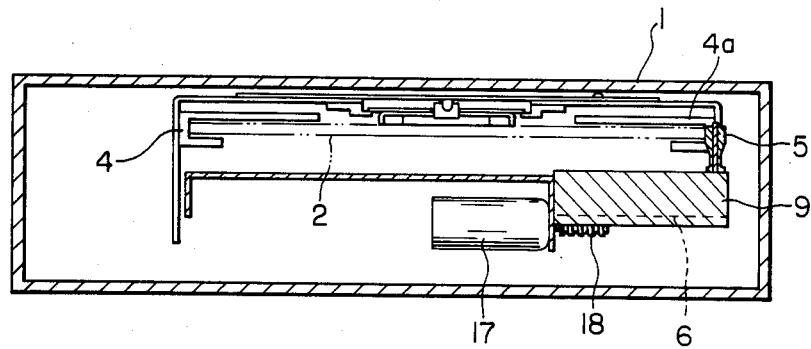
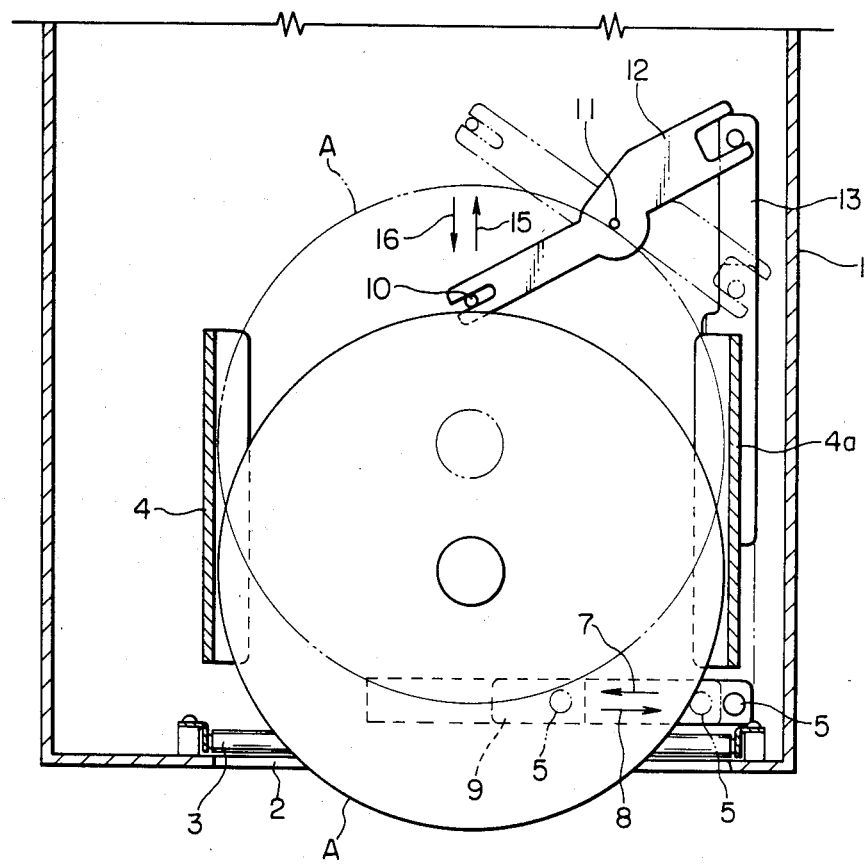

DISC LOADING MECHANISM FOR DISC PLAYER

BACKGROUND OF THE INVENTION

1. Field of the Invention

The present invention relates to a disc player such as a video or compact disc player of slot-in type and, more particularly, a disc loading mechanism for loading the disc player with a disc.

2. Description of the Prior Art

In the disc player of this type according to the prior art, there is widely used a system, in which a turntable can be so brought into and out of a casing having a built-in mechanism body such as playing means that the player is loaded with a disc recorded with data by first bringing the turntable out of the casing, by placing the disc on the turntable, and by bring the turntable again into the casing so as to play the disc. However, that system is required to have a wide operating space in front of the player and to conduct the two actions of bring the turntable into and out of the player, when the player is to be loaded with the disc, so that it has a disadvantage that the disc loading operation is troublesome.

In order to solve the aforementioned problems in the practical use, attention is being paid in recent years to the so-called "slot-in system", in which the casing accommodating the mechanism body of the disc player is formed in its front side with a horizontally elongated disc slot for inserting the disc directly therethrough into the casing and for taking out the disc directly therethrough after the disc playing operation. The disc player adopting that slot-in system is freed from the troublesome bringing actions of the turntable when it is to be used, as is different from the prior art. As a result, the disc player of the slot-in type has its disc loading and unloading actions facilitated to improve its operability and can be dispensed with any mechanism for bringing the turntable into and out of the player. Therefore, the disc player of the slot-in type is expected to have its sized reduced.

However, the compact disc or the video disc is difficult to handle partly because the disc has no surface space to be clamped and partly because the disc is liable to have its surface damaged if it is subjected to a mechanical frictional force or the like. If the slot-in system is adopted, therefore, there arises to the contrary a technical difficulty that the disc loading mechanism is liable to be complicated and large-sized. From the background of the prior art thus far described, there has not been provided yet a disc player of slot-in type which is sufficiently practical.

SUMMARY OF THE INVENTION

It is, therefore, an object of the present invention to provide a disc loading mechanism which can solve the aforementioned problems of the prior art and which can make the disc player simple and compact in construction.

In order to achieve this object, according to the present invention, a pair of guide rails are disposed in the casing of a disc player and at positions to face a slot disc formed in the front side of the casing and are juxtaposed to each other at a spacing slightly larger than the diameter of a disc to be loaded, and a loading roller is interposed between the disc slot and the guide rails and are made reciprocally movable in parallel with the front side of the casing so that it may bring the disc to a play position in the casing.

In a disc player of slot-in type including: disc playing means for playing a disc recorded with data when said disc is brought to a play position; and a casing accommodating said disc playing means therein and formed in its front side with a disc slot through which said disc is inserted directly into said casing, according to a major feature of the present invention, there is provided a disc loading mechanism comprising: a pair of guide rails extending in the casing of said disc player from near the two ends of the disc slot of said casing and juxtaposed to each other at a spacing slightly larger than the diameter of said disc for guiding said disc inbetween; a loading roller interposed between the disc slot of said casing and said guide rails and made rotatable and reciprocally movable in parallel with the front side of said casing for engaging with the circumferential edge of said disc to driving said disc inwardly of said casing until said disc comes to said play position; and drive means for driving said loading roller back and forth.

BRIEF DESCRIPTION OF THE DRAWINGS

Other objects, features and advantages of the present invention will become apparent from the following description taken in conjunction with one embodiment thereof with reference to the accompanying drawings, in which:

FIG. 3 is a section taken along line A—A of FIG. 1; and

FIG. 4 is similar to FIG. 1 but shows the operations of the parts of the disc loading mechanism when the disc is to be loaded and unloaded.

DESCRIPTION OF THE PREFERRED EMBODIMENT

Figure 1:
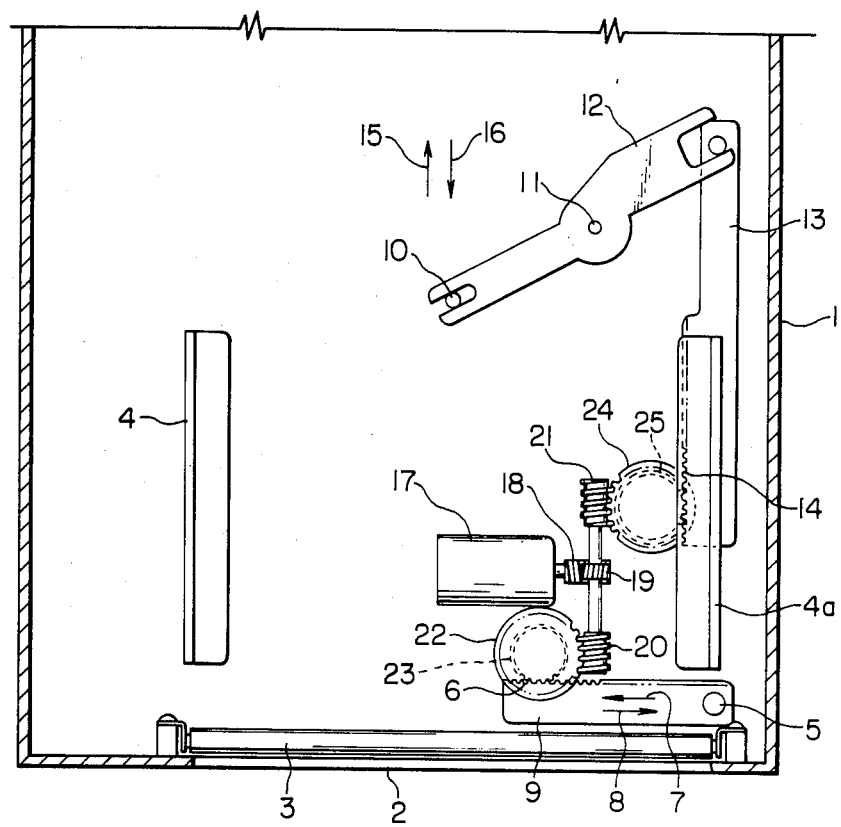
FIG. 1 is a sectional view taken from the top plan of a disc player and showing the arrangement of a disc loading mechanism according to the embodiment of the present invention with the top cover of a casing being taken away.
Figure 2:
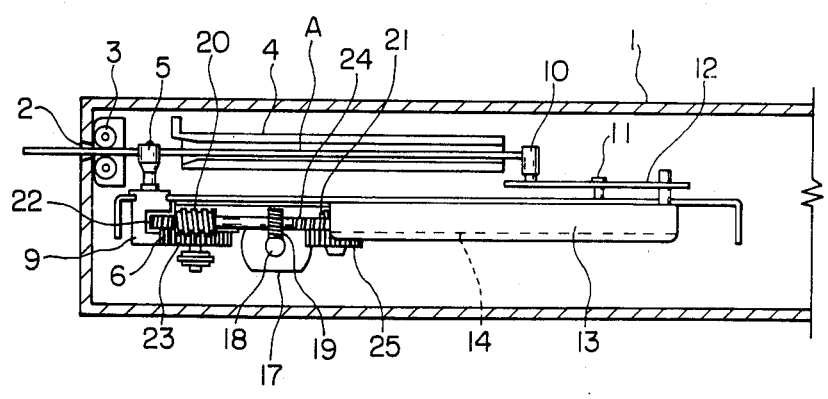
FIG. 2 is a sectional view taken from the side of the disc player and showing the arrangement of the disc loading mechanism with the side plate of the casing being removed.

In the accompanying drawings, reference numeral 1 indicates a casing which accommodates therein a mechanism body such as the disc playing mechanism of a disc player, and numeral 2 indicates a disc slot which is formed to extend horizontally in the front side of the casing 1. Indicated at numerals 3 and 3a are a pair of guide rollers which are so disposed in the casing 1 as to face the disc slot 2. As better seen from FIG. 2, the paired guide rollers 3 and 3a are juxtaposed vertically to each other at a spacing slightly larger than the thickness of a disc A to be loaded. Indicated at numerals 4 and 4a are a pair of disc guides or guide rails which are shaped to have a generally c-shaped section, as better seen from FIG. 3, and which are juxtaposed to have their openings facing each other and at a spacing slightly larger than the diameter of the disc A to be loaded. Indicated at numeral 5 is a loading roller which is interposed between the guide rollers 3 and 3a and the guide rails 4 and 4a. The loading roller 5 is carried rotatably on a moving member 9 which is made reciprocally movable by a later-described drive mechanism in directions (as indicated at arrows 7 and 8) parallel to the front side of the casing 1 having the disc slot 2. Indicated at numeral 10 is an eject roller which is arranged at the rear end portion of the casing 1. The eject roller 10 is carried rotatably on the leading end portion of a turning member 12 which is enabled to turn on a fulcrum 11. Indicated at numeral 13 is a moving member which is connected to the rear end portion of the turning member 12. The moving member 13 is formed in its inner side with a rack 14 so that it can be moved reciprocally in the longitudinal directions (as indicated at arrows 15 and 16) of the casing by the action of a later-described drive mechanism. Indicated at numeral 17 is a motor for driving the aforementioned two moving members 9 and 13. Indicated at numeral 18 is a worm which is fixed to the drive shaft of the motor 17. Indicated at numeral 19 is a worm wheel which is in meshing engagement with that worm 18. Indicated at numerals 20 and 21 which are made coaxial and rotatable with that worm wheel 19. Indicated at numeral 22 is a worm wheel which is in meshing engagement with one 20 of those worms. Indicated at numeral 23 is a worm wheel which is made coaxial and rotatable with that worm wheel 22. Indicated at numeral 24 is a worm wheel which is in meshing engagement with the other 21 of those two coaxial worms 20 and 21. Indicated at numeral 25 is a worm wheel which is made coaxial and rotatable with that worm wheel 24. The aforementioned worm wheel 23 is in meshing engagement with the rack 6 which is formed in the aforementioned transversely moving member 9, whereas the aforementioned worm wheel 25 is in meshing engagement with the rack 14 which is formed in the aforementioned longitudinally moving member 13.

Next, the operations of the disc player having the disc loading mechanism according to the present embodiment will be described in the following.

First of all, in the state wherein the loading roller 5 is positioned at the righthand end of FIG. 5 whereas the eject roller 10 is positioned at the foremost end of its moving stroke, the operator inserts the disc A into the disc slot 2 of the casing 1. When the disc A is inserted to reach a predetermined position, a not-shown motor operating switch is turned on to turn the motor 17 forward so that the loading roller 5 starts to move in the direction of arrow 7 of FIG. 4 through the worm 18, the worm wheel 19, the worm 20, the worm wheels 22 and 23 and the transversely moving member 9. Simultaneously with this, the eject roller 10 starts to move in the direction of arrow 15 of FIG. 4 through the worm 18, the worm wheel 19, the worm 21, the worm wheels 24 and 25, the longitudinally moving member 13 and the turning member 12. When the loading roller 5 comes into abutment against the circumferential edge of the disc A and moves further in the direction of arrow 7, the disc A is forced into the inside of the casing 1 by the pushing force of the loading roller 5. In this meanwhile, the eject roller 10 is carried to the rear end side of the casing 1 progressively in accordance with the revolutions of the motor 17. When the disc A is transferred to a predetermined play position, a not-shown motor stopping switch operates to interrupt the motor 17. Next, a not-shown vertical moving mechanism operates to place the disc A on a not-shown turntable, and a not-shown player operates to reproduce the record which is stored in the disc A.

In case the disc A is to be unloaded from the casing 1, on the contrary, the operator depresses a not-shown unloading button. Then, the not-shown vertically moving mechanism operates to lift the disc A from the turntable to the level of the disc slot 2. Subsequently, a not-shown motor reversing switch is turned on to turn the motor 17 backward. Then, the eject roller 10 starts to advance toward the disc slot 2 (i.e., in the direction of arrow 16) through the worm 18, the worm wheel 19, the worm 21, the worm wheels 24 and 25, the moving member 13 and the turning member 12. Simultaneously with this, the loading roller 5 starts to move in the direction of arrow 8 of FIG. 4 through the worm 18, the worm wheels 19, the worm 20, the worm wheel 19, the worm 20, the worm wheels 22 and 23 and the moving member 9. As a result, the eject roller 8 comes into abutment against the circumferential edge of the disc A to push out the disc A until the disc A is halted at the initial position before the loading operation. Then, the operator can take out the disc A directly from the disc player.

Incidentally, the gist of the present invention resides in the loading mechanism for driving the disc into the casing 1 as well as in the ejecting mechanism for driving the disc out of the casing 1. Therefore, the mechanism for placing the disc in the play position on the turntable in the casing 1 will not be described in detail.

On the other hand, the foregoing embodiment corresponds to the case in which only the loading roller 5 of the two rollers 5 and 10 is made movable reciprocally in parallel with the front side of the casing 1 whereas the remaining eject roller 10 is made movable reciprocally in the longitudinal directions (as indicated at arrows 15 and 16) of the casing 1. Despite of this fact, the gist of the present invention should not be limited to the construction of the embodiment. The eject roller 10 may also be constructed such that it can move reciprocally in parallel with the front side of the casing 1 like the loading roller 5. According to this modification, the depth of the disc player can be further shortened.

As has been described hereinbefore, in the disc loading mechanism of the disc player according to the present invention, the disc is moved longitudinally of the casing by moving the loading roller in parallel with the front side of the casing while restricting the transverse movements of the disc by means of the disc guides. As a result, it is possible to reduce the depthwise size of the casing in which those mechanisms are mounted. Since the disc loading and unloading operations can be effected by means of the single motor, moreover, it is possible to provide the disc player which is simple in its construction and low at its production cost. Since both the loading roller and the eject roller are brought while revolving into abutting contact with the circumferential edge of the disc, still moreover, there arises no fear that the disc does not have its surface damaged.

What is claimed is:

1. In a disc player of the slot-in type having a housing, a disc insertion slot at a front end of the housing which is elongated transversely with its ends spaced apart by a width for accomodating insertion of a disc therethrough longitudinally into the housing, disc playing means for playing a disc inserted in the slot and brought to a playing position within the housing, and a disc loading mechanism for bring an inserted disc to the playing position, an improved disc loading mechanism comprising:
a pair of guide rails extending longitudinally into the casing, said rails having front ends located in the vicinity of the respective ends of the insertion slot and being spaced apart slightly larger than the diameter of the disc, for guiding a disc inserted along an insertion path therebetween to the playing position in said housing;

a loading roller mounted on a first moving member which is disposed at the front end of said housing between said slot and said front ends of said guide rails out of the way of said insertion path, said moving member having a transversely extending rack and being movable reciprocally in the transverse direction parallel to the insertion slot so as to move the loading roller from an unloaded position to one side of one of said guide rails out of the insertion path of a disc, into abutment with a trailing circumferential edge of the inserted disc for pushing the disc inside said housing to the playing position, to a loaded position in said insertion path substantially intermediate the ends of said slot at the back of the disc disposed in the playing position; and drive means for driving said first moving member reciprocally in said transverse direction, including a drive motor and a worm section driven by said drive motor which is engaged with said rack of said first moving member.

2. A disc loading mechanism according to claim 1, wherein said guide rails are formed into a generally C-shaped section and opened to face each other.

3. A disc loading mechanism according to claim 1, further comprising an eject roller mounted on one end of a pivot lever and disposed toward a rear portion of said housing at a center position of said guide rails in said insertion path, the other end of said pivot lever being connected to a second moving member located out of the way of said insertion path toward said one side of said one guide rail, said second moving member having a longitudinally extending rack and being movable reciprocally in the longitudinal direction of said housing parallel to said one side, and said worm section of said drive means being arranged to drive said loading and eject rollers cooperatively together and having a first worm element driven in rotation by said drive motor, a first worm wheel having a first wheel section in mesh with said first worm element and a second wheel section coaxial and rotatable with the first wheel section engaged with said rack of said first moving member, a second worm element driven by said drive motor, a second worm wheel having a first wheel section in mesh with said second worm element and a second wheel section coaxial and rotatable with the first wheel section engaged with said rack of said second moving member, whereby said eject roller is pivoted toward the rear portion of said housing as said loading roller is moved into abutment with the trailing edge of the disc for loading the disc in the playing position, and said eject roller is moved toward the front of said housing as said loading roller is moved back to the unloaded position for ejecting the disc from the housing.

* * * * *